United States Patent

[11] 3,566,813

[72] Inventors Archie D. Staley
 Rte 1;
 Ernest G. Stoess, P.O. Box 656,
 Washtucna, Wash. 99371
[21] Appl. No. 759,439
[22] Filed Sept. 12, 1968
[45] Patented Mar. 2, 1971

[54] SEED BOOT RESTRICTOR FOR SEED DRILLS
 5 Claims, 4 Drawing Figs.
[52] U.S. Cl. .................................................. 111/85,
 111/88
[51] Int. Cl. ...................................................... A01c 5/06
[50] Field of Search .......................................... 111/85, 86,
 87, 88, 73

[56] References Cited
UNITED STATES PATENTS

| | | | |
|---|---|---|---|
| 196,641 | 10/1877 | Defenbaugh | 111/85X |
| 1,328,375 | 1/1920 | Griffice | 111/85X |
| 2,764,111 | 9/1956 | Collins | 111/73X |
| 3,177,830 | 4/1965 | Zimmerman | 111/85 |
| 3,180,291 | 4/1965 | Loomans | 111/85 |
| 3,319,590 | 5/1967 | Zimmerman | 111/85 |
| 3,394,668 | 7/1968 | Hyland | 111/85 |

Primary Examiner—Robert E. Pulfrey
Assistant Examiner—C. Coughenour
Attorney—Wells & St. John ABSTRACT: In a seed drill of the type wherein a bladelike furrow opener is carried at the lower end of and in front of the seed tube, and pairs of rotating packer wheels receive a portion of the seed tube and furrow opener between them, this invention provides a guide means extending downward from the frame to keep the seed tube from swinging or twisting into engagement with the packer wheels. The guide means consists of a forked member fixed to the frame and having its lower portions extending down in front of the packer wheels along the sides of the seed tube and across the tube inhibiting transverse movement of the tube to such extent as to bring the tube into contact with the packer wheels. The seed tube is free to move up and down between the portions of the guide for adjustment of depth of planting of the seed and for transport and is protected against wear by engagement with the rotating packer wheels in all of its positions.

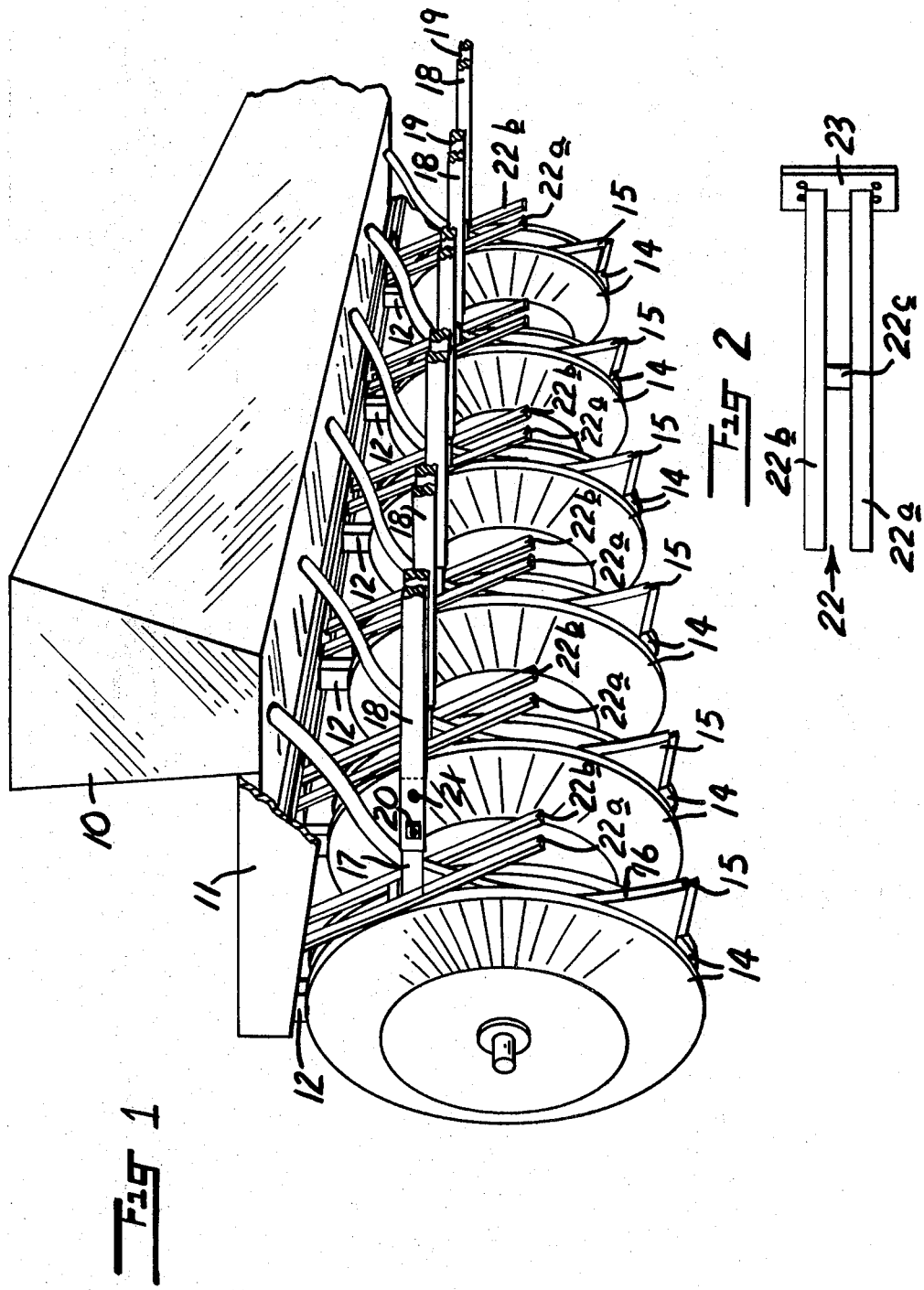

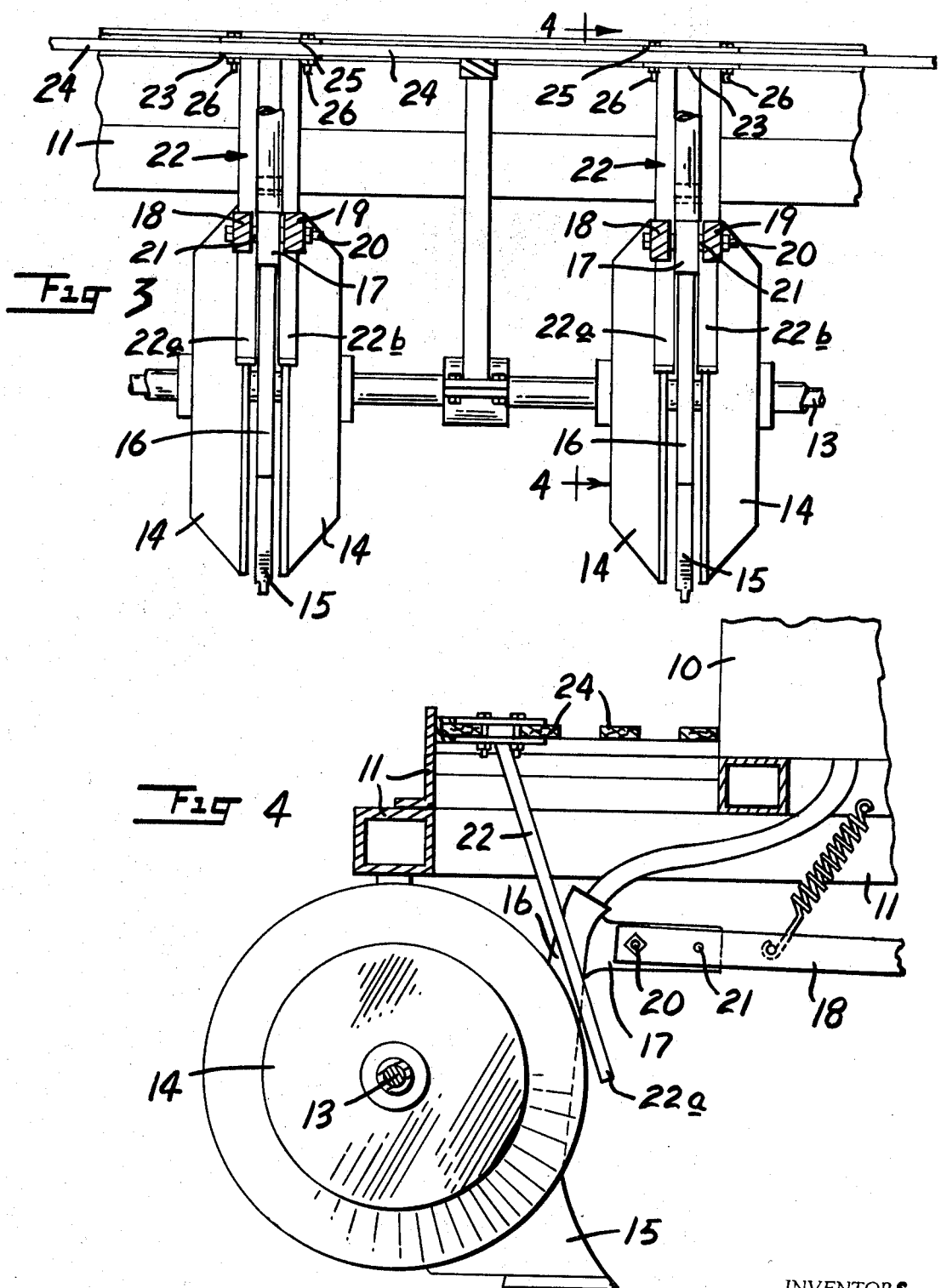

SEED BOOT RESTRICTOR FOR SEED DRILLS

BACKGROUND OF THE INVENTION

The utilization of a furrow opener and seed tube in combination with a pair of presser wheels on opposite sides of and overlapping the seed tube and the shank of the furrow opener so as to bring the packer wheels in proximity to the point of seed planting and to prevent trash lodging on the furrow opener shank has been shown in the Zimmerman U.S. Pat. Nos. 3,177,830 and 3,319,590 and the Loomans U.S. Pat. No. 3,180,291. In the Zimmerman patents the problem of rubbing of the packer wheel edges on the furrow opener shank and seed tube was recognized and solutions were proposed, such as the rollers 48 and 50 in U.S. Pat. No. 3,177,830 and the plates 26 and 27 of U.S. Pat. No. 3,319,590. Such devices, however, merely transfer the wearing action of the packer wheel edges from the shank proper to an intermediate member or members.

PURPOSE OF THE INVENTION

The present invention is directed to providing a guide means, out of position where it might contact with the packer wheels and free of the furrow opener shank and seed tube in order to not impede raising an lowering of the furrow opener, so that the shank and tube cannot be worn by rubbing engagement with the rim edges of the packer wheels.

More specifically this invention provides fixed guides on both sides of the seed tube-shank unit, which extend lengthwise along the unit for a substantial distance and which extend across the unit so as to restrain it from excessive transverse movement or twisting that would bring it into wearing engagement with the adjacent edges of the packer wheels.

GENERAL DESCRIPTION

The preferred embodiment of the invention is shown in the accompanying drawings wherein:

FIG. 1 is a perspective view of a seed drill having a plurality of furrow opener-seed tube-packer wheel assemblies thereon, each of which is protected by the present invention;

FIG. 2 is a face view of one of the guide means removed from the seed drill;

FIG. 3 is a front view of a portion of the drill showing a pair of packer wheel-seed tube assemblies equipped with the present invention; and FIG. 4 is a sectional view taken on the line 4–4 of FIG. 3.

Referring now in detail to the drawings, FIG. 1 illustrates those parts of the seed drill that are associated with the present invention. A seed box 10 is mounted on a framework 11, the rear end of which is supported by standards 12 that are supported on a transverse shaft 13 by suitable bearings, not shown. The shaft 13 has pairs of spaced packer wheels 14 fixed thereto. These packer wheels are of the structure shown in the Zimmerman U.S. Pat. No. 3,319,590. A furrow opener 15 is carried upon a lower end of a seed tube-shank member 16 which is in turn supported on the rear end of an arm 17 which is pivoted between two levers 18 and 19 by a pivot pin 20. The arm 17 is held rigid with the levers 18 and 19 by a shear pin 21 located forwardly of the pivot 20. In such a seed drill as this the furrow opener is raised and lowered by a mechanism such as that shown in FIG. 1 of the Zimmerman U.S. Pat. No. 3,319,590.

The guide means 22 of the present invention consists of two portions or elements 22a and 22b which are fixed to the framework 11 in longitudinal alignment with the packer wheels and which straddle the member 16 so it is slidable up and down therebetween with a clearance of no more than one-sixteenth inch. The portions are bars 22a and 22b that extend downwardly and forwardly just in front of the packer wheels 14 so that they overlap the member 16 for a considerable portion of its length. They cross the member 16 with their lower ends in front of the member 16 and their upper ends behind it. The spacing between the bars 22a and 22b is less than the spacing between the packer wheels 14.

The guide means 22 includes a crossbar 22c joining the bars 22a and 22b together just above and to the rear of the member 16. The means 22 extends upward and has a mounting head 23 at its upper end. This head 23 is shown as a flat plate adapted to engage crossbars 24 that form part of the framework 11. The head 23 is clamped against the bars 24 by a top plate 25 and four bolts 26. It will be appreciated that any suitable head construction that can secure the guard means 22 rigidly to the framework 11 is sufficient. The necessary requirement is that the guide means 22 be secured on the framework so that it cannot move axially with respect to the packer wheels 14.

We prefer to make the bars 22a and 22b of rectangular cross section with flat surfaces facing each other, and of substantial width as shown in FIG. 2 so they are quite rigid. The cross bar 22c aids in preventing any vibration of the guide means 22 in a plane parallel to the packer wheel shaft 13.

With the guide means 22 applied to fit down over each of the individual seed tube-shank members 16 the lateral deflections of the members 16, as the furrow openers 15 are forced through the soil, are kept so small as to prevent contact between the edges of the packer wheels 14 and the member 16.

Thus with guide means 22 the problem of wear of the seed tube by the packer wheels is substantially eliminated.

Having described our invention, we claim:

We claim:

1. In a seed drill having:
 a. a drill frame that is movable over the soil in a longitudinal direction;
 b. a pair of transversely spaced packer wheels rotatably mounted to the drill frame for engaging the soil;
 c. a seed tube-shank member mounted to the drill frame and extending downward toward the soil between the spaced packer wheels;
 d. a furrow opener carried by the seed tube-shank member for engaging the soil forward of the packer wheels; and further comprising the improvement of:
 e. a guide means affixed to the drill frame for limiting the transverse movement of the seed tube-shank member in relation to the spaced packer wheels to prevent the seed tube-shank member from rubbing against the packer wheels as the seed drill is moved over the soil, said guide means being aligned with the packer wheels and having;
 f. a mounting head rigidly affixed to the drill frame; and
 g. spaced elongated parallel elements that extend from the mounting head and straddle the seed tube-shank member without engaging the packer wheels, in which the spacing between the elements is less than the spacing between the packer wheels to prevent the seed tube-shank member from engaging the packer wheels.

2. In the seed drill as defined in claim 1 wherein the mounting head comprises a plate bolted to part of the drill frame in longitudinal alignment with the packer wheels.

3. In the seed drill as defined in claim 1 wherein the guide means comprises two spaced bars having flat surfaces facing each other that are spaced less than the spacing between the packer wheels.

4. In a seed drill as defined in claim 1 wherein the guide means comprises two bars connected to said mounting head and further connected to each other at a distance from the mounting head.

5. In a seed drill as defined in claim 1 wherein the elements straddle the seed tube-shank member above the packer wheels.